US010103928B2

(12) United States Patent
McCoy et al.

(10) Patent No.: US 10,103,928 B2
(45) Date of Patent: Oct. 16, 2018

(54) NYQUIST AND SQUARE ROOT NYQUIST FILTERS FOR PULSE SHAPING IN WIRELESS COMMUNICATIONS

(71) Applicant: National Instruments Corporation, Austin, TX (US)

(72) Inventors: James Wesley McCoy, Leander, TX (US); Lothar Wenzel, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 4 days.

(21) Appl. No.: 15/486,537

(22) Filed: Apr. 13, 2017

(65) Prior Publication Data

US 2017/0338997 A1 Nov. 23, 2017

Related U.S. Application Data

(60) Provisional application No. 62/340,227, filed on May 23, 2016.

(51) Int. Cl.
| | |
|---|---|
| *H04K 1/02* | (2006.01) |
| *H04L 25/03* | (2006.01) |
| *H04L 25/49* | (2006.01) |
| *H04L 27/36* | (2006.01) |
| *H04B 1/10* | (2006.01) |
| *H04B 1/04* | (2006.01) |
| *H04L 27/38* | (2006.01) |

(52) U.S. Cl.
CPC ......... *H04L 27/366* (2013.01); *H04B 1/0475* (2013.01); *H04B 1/10* (2013.01); *H04L 27/38* (2013.01)

(58) Field of Classification Search
CPC .................................................. H04L 27/2627
See application file for complete search history.

(56) References Cited

U.S. PATENT DOCUMENTS

| | | |
|---|---|---|
| 4,731,800 A | 3/1988 | Motley et al. |
| 5,487,089 A | 1/1996 | Misaizu et al. |
| | (Continued) | |

OTHER PUBLICATIONS

Luther, "5G Massive MIMO Testbed: From Theory to Reality", National Instruments, Jun. 8, 2016, pp. 1-11.

(Continued)

*Primary Examiner* — Shuwang Liu
*Assistant Examiner* — Gina McKie
(74) *Attorney, Agent, or Firm* — E. Alan Davis; James W. Huffman

(57) ABSTRACT

Nyquist filters for pulse shaping and related matched filters in wireless communications are disclosed that provide improved performance. The disclosed embodiments recognize that the second derivative of the raised cosine function is discontinuous in the frequency domain and that the first derivative of the square root raised cosine is discontinuous in the frequency domain. As such, a generalization for the raised cosine filter is applied, and improvements can be made to the raised cosine function time-frequency localization and ultimately to tradeoffs between inter-symbol interference and adjacent channel interference by introducing smoothness to the higher order derivatives of the frequency response.

24 Claims, 9 Drawing Sheets

(56) References Cited

U.S. PATENT DOCUMENTS

| | | | |
|---|---|---|---|
| 6,373,955 B1* | 4/2002 | Hooley | H03K 7/08 381/332 |
| 6,628,728 B1 | 9/2003 | McCarty, Jr. | |
| 8,325,755 B2 | 12/2012 | Lee et al. | |
| 9,191,161 B2 | 11/2015 | Li et al. | |
| 2007/0281633 A1* | 12/2007 | Papadopoulos | H04B 7/024 455/101 |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2017/0290013 A1 | 10/2017 | McCoy et al. | |

OTHER PUBLICATIONS

"Introduction to the NI mmWave Transceiver System Hardware", National Instruments, Apr. 20, 2016, pp. 1-8.

"National Instruments Wireless Research Handbook", National Instruments, May 2016, pp. 1-37.

Shepard et al. "Argos: Practical Many-Antenna Base Stations" MobiCom 12, Aug. 22-26, 2012, Istanbul, Turkey, pp. 53-64.

Khoolenjani, et al. "Distribution of the Ratio of Normal and Rice Random Variables" Digital Commons @WayneState, *Journal of Modern Applied Statistical Methods*, vol. 12, Issue 2, Article 27, Nov. 1, 2013, pp. 1-15.

Shen et al. "Channel Estimation in OFDM Systems", Freescale Semiconductor, Inc. Application Note, Jan. 2006, pp. 1-16.

Vieira et al., "Reciprocity calibration methods for Massive MIMO based on antenna coupling", Department of Electrical Engineering, Lund University, 5 pp. (Jan. 1, 2014).

Harris, "*University of Bristol and Lund University Partner with NI to Set World Records in 5G Wireless Spectral Efficiency Using Massive MIMO*", 7 pp. (May 2016).

"*LTE in a Nutshell—Physical Layer*", Telesystem Innovations Inc. White Paper, 18 pp. (2010).

"*An Introduction to Orthogonal Frequency Division Multiplex Technology*", Keithley Instruments, Inc., 66 pp. (2008).

Huawei et al., "*WF on CSI Acquisition in NR*", 3GPP TSG RAB WG1 Meeting #85, 4 pp. (May 27, 2016).

Huawei et al., "*WF on CSI Acquisition Framework in NR*", 3GPP TSG RAN WG1 Meeting #85, 3 pp. (May 27, 2016).

"*Study on latency reduction techniques for LTE*", 3GPP TR 36.881 Technical Report, 92 pp. (Feb. 2016).

"*Study on Scenarios and Requirements for Next Generation Access Technologies*", 3GPP TR 38.913 Technical Report, 19 pp. (Feb. 2016).

Vieira et al., "*A Flexible 100-antenna testbed for Massive MIMO*", Department of Electrical and Information Technology at Lund University, 7 pp. (Jan. 1, 2014).

"*Bristol and Lund set a new world record in 5G wireless spectrum efficiency*", University of Bristol News, 6 pp. (Mar. 23, 2016).

"*Study on NR New Radio Access Technology*", 3GPP TSG RAN Meeting #71, 8 pp. (Mar. 2016).

Working Group Communication Architectures and Technologies, *LTE Small Cell Enhancement by Dual Connectivity*, Wireless World Research Forum, 22 pp. (Nov. 2014).

"*LTE in a Nutshell: Protocol Architecture*" Telesystem Innovations Inc. White Paper, 12 pp. (2010).

"*LTE Random Access Procedure*", EventHelix.com Inc., 5 pp (2015).

* cited by examiner

NYQUIST AND SQUARE ROOT NYQUIST FILTERS FOR PULSE SHAPING IN WIRELESS COMMUNICATIONS

RELATED APPLICATIONS

This application claims priority to the following provisional application: U.S. Provisional Patent Application Ser. No. 62/340,227, filed May 23, 2016, and entitled "NYQUIST AND SQUARE ROOT NYQUIST FILTER STRUCTURES FOR PULSE SHAPING IN WIRELESS COMMUNICATIONS," which is hereby incorporated by reference in its entirety.

TECHNICAL FIELD

The disclosed embodiments relate to wireless telecommunications.

BACKGROUND

Pulse shaping is a common technique in wireless communications systems for band limiting digital data transmissions. Matched square root Nyquist filters are pulse shapes often used to communicate those signals with optimal signal to noise ratio. A Nyquist filter is a general term used for a filter with a specific property of being able to recover data (e.g., often from QAM (quadrature amplitude modulation) modulated symbols) filtered using the filter with a zero inter-symbol interference (ISI) property. The most common Nyquist filter is a Raised Cosine (RC) filter. RC filters, however, often suffer from poor smoothness properties that can degraded performance in pulse shaping for wireless communications.

SUMMARY

Nyquist filter embodiments for pulse shaping and related matched filters in wireless communications are disclosed that provide new Nyquist filters with improved performance. In part, the disclosed embodiments recognize that the second derivative of the raised cosine function is discontinuous in the frequency domain and that the first derivative of the square root raised cosine is discontinuous in the frequency domain. As such, a generalization for the raised cosine filter can be applied, and improvements can be made to the raised cosine function time-frequency localization and ultimately to tradeoffs between inter-symbol interference and adjacent channel interference by introducing smoothness to the higher order derivatives of the frequency response. Other variations can also be implemented while still taking advantage of the new Nyquist filter embodiments and related components described herein.

For one embodiment, an apparatus to receive wireless communications is disclosed including an antenna, receive circuitry coupled to receive input signals from the antenna that have a pulse shaping modulation, and a matched filter within the receive circuitry coupled to receive the input signals and to remove the pulse shaping modulation, where the matched filter is a generalized Nyquist filter that has a frequency response (H(f)) represented by frequency response equations:

$$H(f) = T; \text{ for } |f| \le (1-\beta)/2T$$

$$H(F) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}|f| - \frac{1-\beta}{2T}\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T,$$

where f represents frequency, $A_n$ represent coefficients, T represents a symbol period, n represents an integer, and β represents a roll-off factor for these frequency response equations.

In additional embodiments, the apparatus also includes a decoder within the receive circuitry coupled to receive filtered signals from the matched filter and to output decoded signals. In further embodiments, the apparatus also includes MAC (media access control) circuitry coupled to receive the decoded signals from the decoder and to output processed signals through an external interface.

In additional embodiments, the coefficients ($A_n$) satisfy a matrix (M(n)) for any given integer (n) represented by:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}$$

In further embodiments, the equations parameters are the following: n=2, $A_1$=9/8, and $A_3$=−1/8; or n=3, $A_1$=75/64, $A_3$=−25/128, and $A_5$=3/128. In additional embodiments, the matched filter includes a plurality of sub-filters combined to form a linear combination of Nyquist filters each having a frequency response (H(f)) represented by the frequency response equations above and satisfying the matrix (M(n)) for any given integer (n).

For one embodiment, an apparatus to transmit wireless communications is disclosed including an antenna, transmit circuitry coupled to provide transmit signals to the antenna that have a pulse shaping modulation; and a pulse shape filter within the transmit circuitry coupled to receive output signals and to apply the pulse shaping modulation to the output signals for the transmit circuitry, where the pulse shape filter is a generalized Nyquist filter that has a frequency response (H(f)) represented by frequency response equations:

$$H(f) = T; \text{ for } |f| \le (1-\beta)/2T$$

$$H(f) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}|f| - \frac{1-\beta}{2T}\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T,$$

where f represents frequency, $A_n$ represent coefficients, T represents a symbol period, n represents an integer, and β represents a roll-off factor for these frequency response equations.

In additional embodiments, the apparatus also includes a modulator within the transmit circuitry coupled to provide modulated output signals to the pulse shape filter. In further embodiments, the apparatus also includes MAC (media access control) circuitry coupled to process signals received through an external interface and to provide processed signals to the modulator.

In additional embodiments, the coefficients (An) satisfy a matrix (M(n)) for any given integer (n) represented by:

$$M(n) \begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}$$

In further embodiments, the equations parameters are the following: n=2, $A_1$=9/8, and $A_3$=−1/8; or n=3, $A_1$=75/64, $A_3$=−25/128, and $A_5$=3/128. In additional embodiments, the matched filter includes a plurality of sub-filters combined to form a linear combination of Nyquist filters each having a frequency response (H(f)) represented by the frequency response equations above and satisfying the matrix (M(n)) for any given integer (n).

For one embodiment, a method to receive wireless communications is disclosed including receiving input signals through an antenna that have a pulse shaping modulation, filtering the input signals circuitry with a matched filter to remove the pulse shaping modulation, and outputting the filtered signals for further processing by receive circuitry, where the matched filter is a generalized Nyquist filter that has a frequency response (H(f)) represented by the frequency response equations:

$$H(f) = T; \text{ for } |f| \leq (1-\beta)/2T$$

$$H(f) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \leq \frac{1+\beta}{2T}$$

$$H(f) = 0; \text{ for } |f| > (1+\beta)/2T,$$

where f represents frequency, $A_n$ represent coefficients, T represents a symbol period, n represents an integer, and β represents a roll-off factor for these frequency response equations.

In additional embodiments, the method also includes decoding the filtered signals to output decoded signals for the receive circuitry. In further embodiments, the method also includes processing the decoded signals with MAC (media access control) circuitry and outputting processed signals through an external interface.

In additional embodiments, the coefficients ($A_n$) satisfy a matrix (M(n)) for any given integer (n) represented by:

$$M(n) \begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}$$

In further embodiments, the equations parameters are the following: n=2, $A_1$=9/8, and $A_3$=−1/8; or n=3, $A_1$=75/64, $A_3$=−25/128, and $A_5$=3/128. In additional embodiments, the matched filter includes a plurality of sub-filters combined to form a linear combination of Nyquist filters each having a frequency response (H(f)) represented by the frequency response equations above and satisfying the matrix (M(n)) for any given integer (n).

For one embodiment, a method to transmit wireless communications is disclosed including receiving output signals to be transmitted, filtering the output signals with a pulse shape filter to apply a pulse shaping modulation and to generate transmit signals having the pulse shaping modulation, and transmitting the transmit signals through an antenna, where the pulse shape filter is a generalized Nyquist filter that has a frequency response (H(f)) represented by frequency response equations:

$$H(f) = T; \text{ for } |f| \leq (1-\beta)/2T$$

$$H(f) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \leq \frac{1+\beta}{2T}$$

$$H(f) = 0; \text{ for } |f| > (1+\beta)/2T,$$

where f represents frequency, $A_n$ represent coefficients, T represents a symbol period, n represents an integer, and β represents a roll-off factor for these frequency response equations.

In additional embodiments, the method also includes modulating the output signals prior to the filtering. In further embodiments, the method also includes receiving external signals from an external interface with MAC (media access control) circuitry and providing processed signals for the modulating.

In additional embodiments, the coefficients ($A_n$) satisfy a matrix (M(n)) for any given integer (n) represented by:

$$M(n) \begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}$$

In further embodiments, the equations parameters are the following: n=2, $A_1$=9/8, and $A_3$=−1/8; or n=3, $A_1$=75/64, $A_3$=−25/128, and $A_5$=3/128. In additional embodiments, the matched filter includes a plurality of sub-filters combined to form a linear combination of Nyquist filters each having a frequency response (H(f)) represented by the frequency response equations above and satisfying the matrix (M(n)) for any given integer (n).

Different or additional features, variations, and embodiments can be implemented, if desired, and related apparatus and methods can be utilized, as well.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

DETAILED DESCRIPTION

Nyquist filter embodiments for pulse shaping and related matched filters in wireless communications are disclosed that provide new Nyquist filters with improved performance. In part, the disclosed embodiments recognize that the second derivative of the raised cosine function is discontinuous in the frequency domain and that the first derivative of the square root raised cosine is discontinuous in the frequency domain. As such, a generalization for the raised cosine filter can be applied, and improvements can be made to the raised cosine function time-frequency localization and ultimately to tradeoffs between inter-symbol interference and adjacent channel interference by introducing smoothness to the higher order derivatives of the frequency response.

Example objectives, components, and features are now described in more detail. A general transmit/receive architecture is first described for wireless communications, although the Nyquist filter structures described herein can be used in a wide variety of applications and system implementations. Next, generalized raised cosine (GRC) filters are described followed by a comparison of root raised-cosine (RC) filters used for matched filtering to generalized root raised-cosine (GRRC) filters use for matched filtering. Performance metrics for the raised-cosine Nyquist filter structures described herein are also described. It is noted that different and/or additional features can also be implemented, as desired, and related systems and methods can be utilized as well. It is further noted that example Nyquist filters and raised cosine filters are described, for example, in U.S. Pat. No. 6,628,728, U.S. Pat. No. 5,487,089, and U.S. Pat. No. 4,731,800, each of which is hereby incorporated by reference in its entirety.

Example Transmit/Receive Architecture for Wireless Communications

Figure 1:
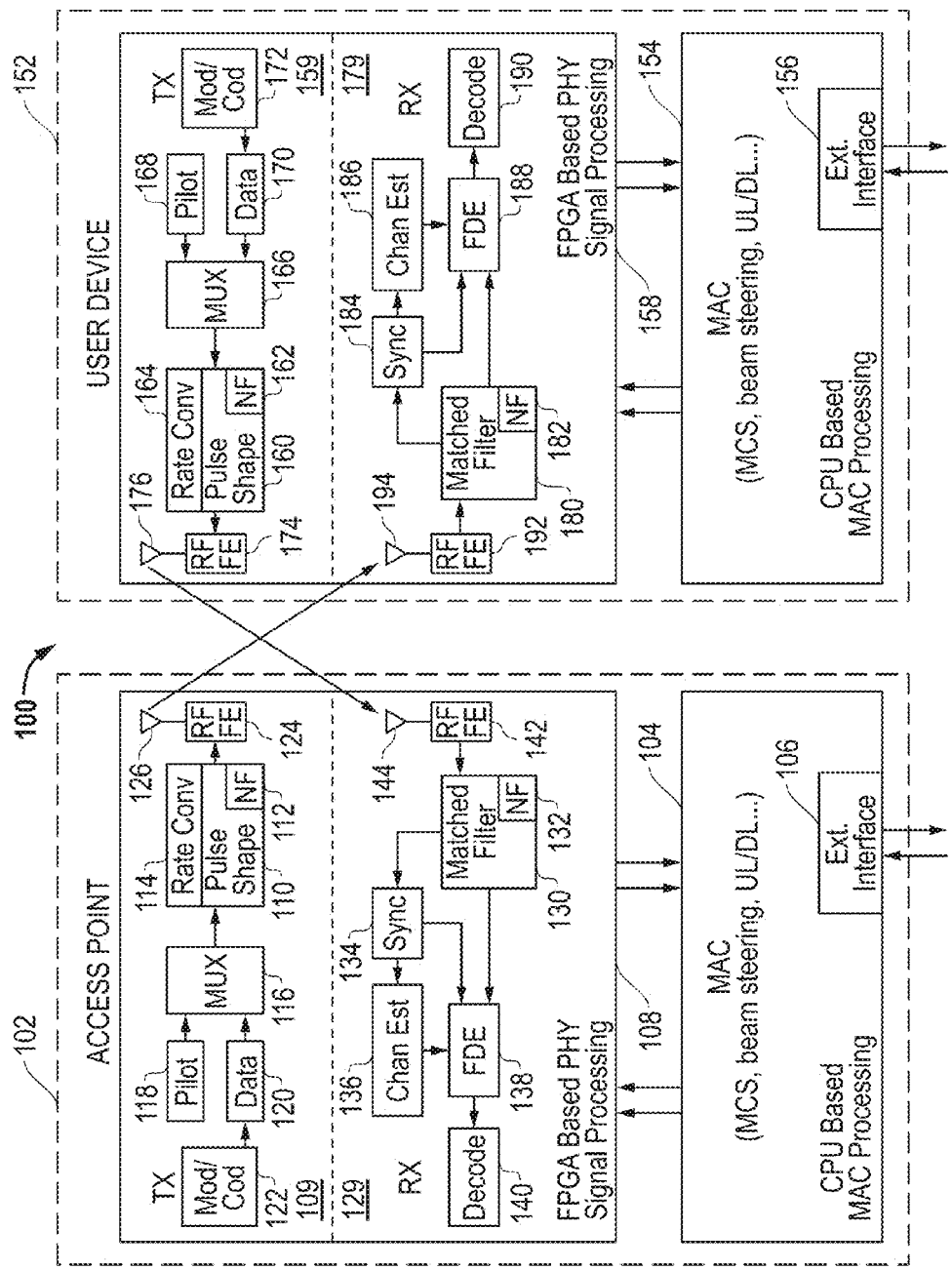
FIG. 1 is a block diagram of an example embodiment for transmit and receive architectures for wireless access points and user devices within a wireless communication system that can use the Nyquist filter embodiments described herein.

FIG. 1 is a block diagram of an example embodiment 100 for transmit and receive architectures for wireless access points and user devices 102/152 within a wireless communication system. The example wireless access point 102 and user device 152 each include CPU (central processing unit) based MAC (media access control) processing 104/154 and FPGA (field programmable gate array) based transmit/receive (TX/RX) physical layer (PHY) signal processing 108/158.

The transmit (TX) path circuitry 109/159 for the access point 102 and the user device 152 includes a modulator/coder (Mod/Cod) 122/172 that modulates and/or codes data 120/170 onto a carrier signal that is combined with pilot signal 118/168 by a multiplexer (MUX) 116/166 and provided to output circuitry. The output circuitry further provides rate converter 114/164, pulse shape filter 110/160, and/or other functions to the transmit signals (e.g., carrier plus pilot) prior to the signal being transmitted through an antenna 126/176 to the receive section 129/179 of the other system. As described herein, a Nyquist filter 112/162 can be used to add the pulse shaping modulation to the transmit signals. Further, output circuitry for the transmit path circuitry 109/159 can include a radio frequency front-end (RFFE) 124/174 that provides digital-to-analog converters, up-conversion mixers, power amplifiers, and/or other output circuitry that facilitates the transmission of the wireless signals through the antenna 126/176 that have been modulated using the pulse shaping function applied by the pulse shape filter 112/162.

Each receive (RX) path circuitry 129/179 for the access point 102 and the user device 152 receives the transmitted wireless signals (e.g., carrier and pilot signal) through an antenna 144/194 and provides it to a matched filter 130/180. The matched filter 130/180 is matched to the pulse shaping function applied by the pulse shape filter 110/160 within the transmit circuitry 109/159, remove the pulse shaping modulation, and outputs a filtered signal to a frequency domain equalization (FDE) module 138/188. A synchronization (SYNC) block 134/184 also receives the filtered signal and provides a synchronization signal to the channel estimator (Chan Est) 136/186 and the FDE module 138/188. The channel estimator 136/186 provides a received signal strength estimate to the FDE module 138/188. The output of the FDE module 138/188 is provided to the decoder (DECODE) 140/180 which decodes and demodulates the received signals. As described herein, a Nyquist filter 132/182 can be used to provide the matched filter that is matched to remove the pulse shaping provided by the pulse shape filter 112/162. Further, input circuitry for the receive path circuitry 129/179 can include a radio frequency front-end (RFFE) 142/192 that provides analog-to-digital converters, down-conversion mixers, low noise amplifiers, and/or other input circuitry that facilitates the reception of the wireless signals through the antenna 144/194.

The MAC processing circuitry 104/154 for the access point 102 and the user device 152 includes one or more processing features such as mobile communication services (MCS), beam steering, uplink (UL) control, downlink (DL) control, and/or other MAC processing features. The MAC processing circuitry 104/154 also provides an external communication interface 106/156, for example, to other processing circuits such as host processors. The TX/RX signal processing circuitry 108/158 and MAC processing circuitry 104/154 can also communicate information with each other such as MAC parameters, payload information, PHY measurements, decoded data, and/or other desired information.

The Nyquist filters described herein can be used, for example, with respect to the pulse shape filter 110/160 in the transmit (TX) path circuitry 109/159 and/or with respect to the matched filter 130/180 in the receive (RX) path circuitry 129/179 for the example embodiment provided in FIG. 1. Further, it is noted that disclosed embodiments can be used in a variety of communication systems having one or more Nyquist filters and/or square root Nyquist filters. Such communications can include, for example, single carrier, OFDM (orthogonal frequency division multiplexing) systems, f-OFDM (filtered-OFDM) systems, GFDM (generalized frequency division multiplexing) systems, UFMC (universal filtered multi-carrier) systems, and/or types of wireless communication systems that use Nyquist filters or square root Nyquist filters for pulse shaping of transmitted signals.

As described herein, Nyquist filter embodiments are implemented using generalized raised cosine (GRC) filters that provide improved pulse shaping. In particular, the Nyquist filter structures described herein include Nyquist filters and their square root complements with nth-order smoothness (e.g., n continuous derivatives). These Generalized Raised Cosine (GRC) filters are useful for a variety of applications. For example, the GRC and GRRC filters described herein can be used to provide improved performance for pulse shaping for transmit (TX) and receive (RX) operations in wireless communications. Further, linear combinations of GRC and GRRC sub-filters are also described herein and can be used to further improve OOB (out of band) and ISI (inter-symbol interference) performance for wireless communications. Other variations can also be implemented.

Generalized Raised Cosine Filters

The definitions for raised-cosine filters are generalized below, starting with additional smoothness conditions in frequency space, to form generalized raised cosine (GRC) filters. Smoothness in frequency space translates into better decay behavior in time by applying the inverse Fourier transform. Also discussed is in what sense the notion of root raised-cosine filter could be generalized. The latter includes factorizations of frequency functions.

Frequency Domain

Let T be the symbol period. The frequency behavior H(f) of the raised-cosine filter is defined by:

$$H(f) = \begin{cases} T, & |f| \le \frac{1-\beta}{2T} \\ \frac{T}{2}\left\{1 + \cos\left(\frac{\pi T}{\beta}\left[|f| - \frac{1-\beta}{2T}\right]\right)\right\}, & \frac{1-\beta}{2T} < |f| \le \frac{1+\beta}{2T} \\ 0, & \text{else} \end{cases} \quad (1)$$

Here, $0 \le \beta \le 1$ is the so-called roll-off factor. H(f) is even-symmetric around f=0 and odd-symmetric in the vicinity of $$f = \pm \frac{1}{2T}.$$

The impulse response h(t) of the filter for $$t \ne \pm \frac{T}{2\beta}$$

is:

$$h(t) = \text{sinc}\left(\frac{t}{T}\right) \frac{\cos\left(\frac{\pi \beta t}{T}\right)}{1 - \left(\frac{2\beta t}{T}\right)^2} \quad (2)$$

For $$t = \pm \frac{T}{2\beta}$$

the response h(t) is the continuation of the defined function.

The degree of smoothness of H(f) has an impact on the behavior of h(t). Smoothness of H(f) depends entirely on the behavior of H(f) at the critical points $$|f| = \frac{1 \pm \beta}{2T}.$$

In the vicinity of any other frequency the function H(f) is analytical in f.

It can be shown that H(f) and all odd derivatives of H(f) are continuous at $$|f| = \frac{1 \pm \beta}{2T}.$$

This means that H(f) and all odd derivatives of H(f) are continuous everywhere. But this statement is not true for derivatives of even order starting with the second derivative. Given the structure of H(f), the values of potentially continuous derivatives of H(f) must vanish at $$|f| = \frac{1 \pm \beta}{2T}$$

(because H(f) is constant on each side).

The odd-symmetry of H(f) in the vicinity of $$f = \pm \frac{1}{2T}$$

resulting from the expression $$H(f) = \frac{T}{2}\left\{1 + \cos\left(\frac{\pi T}{\beta}\left[|f| - \frac{1-\beta}{2T}\right]\right)\right\} \quad (3)$$

can be maintained by using the following more general model:

$$H(f) = \quad (4)$$
$$\frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \right.$$
$$\left. \ldots + A_{2n+1}\cos\left((2n+1)\frac{\pi T}{\beta}\left[|f| - \frac{1-\beta}{2T}\right]\right)\right\}$$
$$\text{for } \frac{1-\beta}{2T} < |f| \le \frac{1+\beta}{2T}$$

Also, $H(f) = T$ for $|f| \le \frac{1-\beta}{2T}$ and $H(f) = 0$ else.

Of course, there is no analytical continuation of H(f) possible that has values 0 and T on separated intervals. One can only increase the number of derivatives that are continuous everywhere.

The choice n=1 in conjunction with $A_0 = A_1 = 1$ recovers the raised cosine filter.

For the general case the following conditions must be satisfied where 2m is the order of the highest even derivative of interest:

$$H\left(\frac{1}{2T}\right) = \frac{T}{2}$$

$$H\left(\frac{1-\beta}{2T}\right) = T \text{ and } H\left(\frac{1+\beta}{2T}\right) = 0$$

$$H^{(1)}\left(\frac{1-\beta}{2T}\right) = 0 \text{ and } H^{(1)}\left(\frac{1+\beta}{2T}\right) = 0$$

...

$$H^{(2m)}\left(\frac{1-\beta}{2T}\right) = 0 \text{ and } H^{(2m)}\left(\frac{1+\beta}{2T}\right) = 0$$

The first equation translates into $$\frac{T}{2}(A_0) = \frac{T}{2} \text{ i.e. } A_0 = 1 \tag{5}$$

For $$f = \frac{1-\beta}{2T}$$

we have $$H(f) = \frac{T}{2}\{1 + A_1 + A_3 + \ldots + A_{2n+1}\} = T \text{ while } f = \frac{1+\beta}{2T}$$

results in $$H(f) = \frac{T}{2}\{1 - A_1 - A_3 - \ldots - A_{2n+1}\} = 0.$$

This is just one condition only:

$$A_1 + A_3 + \ldots + A_{2n+1} = 1 \tag{6}$$

As in the case of raised-cosine filters, all odd derivatives of H vanish at frequencies f with $$|f| = \frac{1 \pm \beta}{2T}.$$

The two conditions for each even derivative 2k are redundant and generate the following equation:

$$1^{2k}A_1 + 3^{2k}A_3 + \ldots + (2n+1)^{2k}A_{2n+1} = 0 \tag{7}$$

The complete system of conditions can be expressed in matrix notation.

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix} \tag{8}$$

This linear system has a unique solution for any n.

Example 1: n=1

The matrix in (8) reduces to the identity 1 scalar and the unique solution is $A_1 = 1$. The raised-cosine filter is recovered again. It is well-known that the factorization $$H(f) = \frac{T}{2}\left\{1 + \cos\left(1\frac{\pi T}{\beta}\left[|f| - \frac{1-\beta}{2T}\right]\right)\right\} = T\left\{\cos^2\left(\frac{\pi T}{2\beta}\left[|f| - \frac{1-\beta}{2T}\right]\right)\right\} \tag{9}$$

is one of the most useful features of the raised-cosine filter as it allows the construction of the root raised-cosine matched filter.

Example 2: n=2

This is the first nontrivial situation. Solving the linear equations (8) result in $$A_1 = \frac{9}{8} \text{ and } A_3 = -\frac{1}{8}.$$

$$H(f) = \frac{T}{2}\left\{1 + \frac{9}{8}\cos\left(1\frac{\pi T}{\beta}\left[|f| - \frac{1-\beta}{2T}\right]\right) - \frac{1}{8}\cos\left(3\frac{\pi T}{\beta}\left[|f| - \frac{1-\beta}{2T}\right]\right)\right\} \tag{10}$$

Again, this expression can be factored but not in a balanced fashion.

Example 3: n=3

Solving the linear equations (8) lead to $$A_1 = \frac{75}{64}, A_3 = \frac{-25}{128}, A_5 = \frac{3}{128}.$$

$$H(f) = \tag{11}$$
$$\frac{T}{2}\left\{1 + \frac{75}{64}\cos\left(1\frac{\pi T}{\beta}\left[|f| - \frac{1-\beta}{2T}\right]\right) - \frac{25}{128}\cos\left(3\frac{\pi T}{\beta}\left[|f| - \frac{1-\beta}{2T}\right]\right) + \frac{3}{128}\cos\left(5\frac{\pi T}{\beta}\left[|f| - \frac{1-\beta}{2T}\right]\right)\right\}$$

This expression can be factored but, similar to the case n=2, not in a balanced fashion that would allow using a simple square root to generate closed-form root-versions.

We discuss now potential factorizations. Using $$z = \frac{\pi T}{\beta}\left[|f| - \frac{1-\beta}{2T}\right]$$

for n=1 the factorization can be expressed as follows (using T=1 to simplify notation):

$$\frac{1}{2}(1 + \cos(z)) = \cos^2\left(\frac{z}{2}\right).$$

For n=2 we have $$\frac{1}{2}(1 + 9/8\cos(1z) - 1/8\cos(3z)) = \quad (12)$$

$$\cos^4\left(\frac{z}{2}\right)(2 - \cos(z)) = \cos^4\left(\frac{z}{2}\right)\left(3 - 2\cos^2\left(\frac{z}{2}\right)\right)$$

While the raised-cosine filter generates a frequency response H(f) with the property that $\sqrt{H(f)}$ has a closed form inverse Fourier transform, the same is not true for generalized raised-cosine filters resulting from (8) for higher orders. But there are asymmetric factorizations with components that have closed form inverse Fourier transforms, e.g.

$$\frac{1}{2}(1 + 9/8\cos(1z) - 1/8\cos(3z)) = \quad (13)$$

$$\cos^4\left(\frac{z}{2}\right)\left(3 - 2\cos^2\left(\frac{z}{2}\right)\right) = \left[\cos^2\left(\frac{z}{2}\right)\right] *$$

$$\left[(3 - 2\cos^2\left(\frac{z}{2}\right))\cos^2\left(\frac{z}{2}\right)\right] = \left[\cos^3\left(\frac{z}{2}\right)\right] * \left[(3 - 2\cos^2\left(\frac{z}{2}\right))\right]$$

$$\cos\left(\frac{z}{2}\right)] = \left[\cos^2\left(\frac{z}{2}\right)(\sqrt{3} - \sqrt{2}\cos\left(\frac{z}{2}\right))\right] *$$

$$\left[\cos^2\left(\frac{z}{2}\right)(\sqrt{3} + \sqrt{2}\cos\left(\frac{z}{2}\right))\right]$$

For n=3 we have essentially two main alternative viewpoints and but also many modifications:

$$\frac{1}{2}\left(1 + \frac{75}{64}\cos(1z) - \frac{25}{128}\cos(3z) + \frac{3}{128}\cos(5z)\right) = \quad (14)$$

$$\cos^6\left(\frac{z}{2}\right)\left(10 - 15\cos^2\left(\frac{z}{2}\right) + 6\cos^4\left(\frac{z}{2}\right)\right) =$$

$$\left[\cos^3\left(\frac{z}{2}\right)\right] * \left[10 - 15\cos^2\left(\frac{z}{2}\right) + 6\cos^4\left(\frac{z}{2}\right)\right)\cos^3\left(\frac{z}{2}\right)\right] = \left[\cos^2\left(\frac{z}{2}\right)\right] *$$

$$\left[\cos^2\left(\frac{z}{2}\right)\right] * \left[(10 - 15\cos^2\left(\frac{z}{2}\right) + 6\cos^4\left(\frac{z}{2}\right))\cos^2\left(\frac{z}{2}\right)\right] =$$

$$\left[\cos^5\left(\frac{z}{2}\right)\right] * \left[(10 - 15\cos^2\left(\frac{z}{2}\right) + 6\cos^4\left(\frac{z}{2}\right))\cos\left(\frac{z}{2}\right)\right]$$

All factors have closed form inverse Fourier transforms. For higher orders there will even be more interpretations, i.e. the number of potential factorizations is larger.

Representations (13) and (14) can be seen as products of standard raised-cosine like frequency behavior where exactly one factor has additional complexity. But the additional complexity still allows for closed-form inverse Fourier transforms. Although there is no closed form for the GRRC, it may be computed numerically.

Figure 2A:
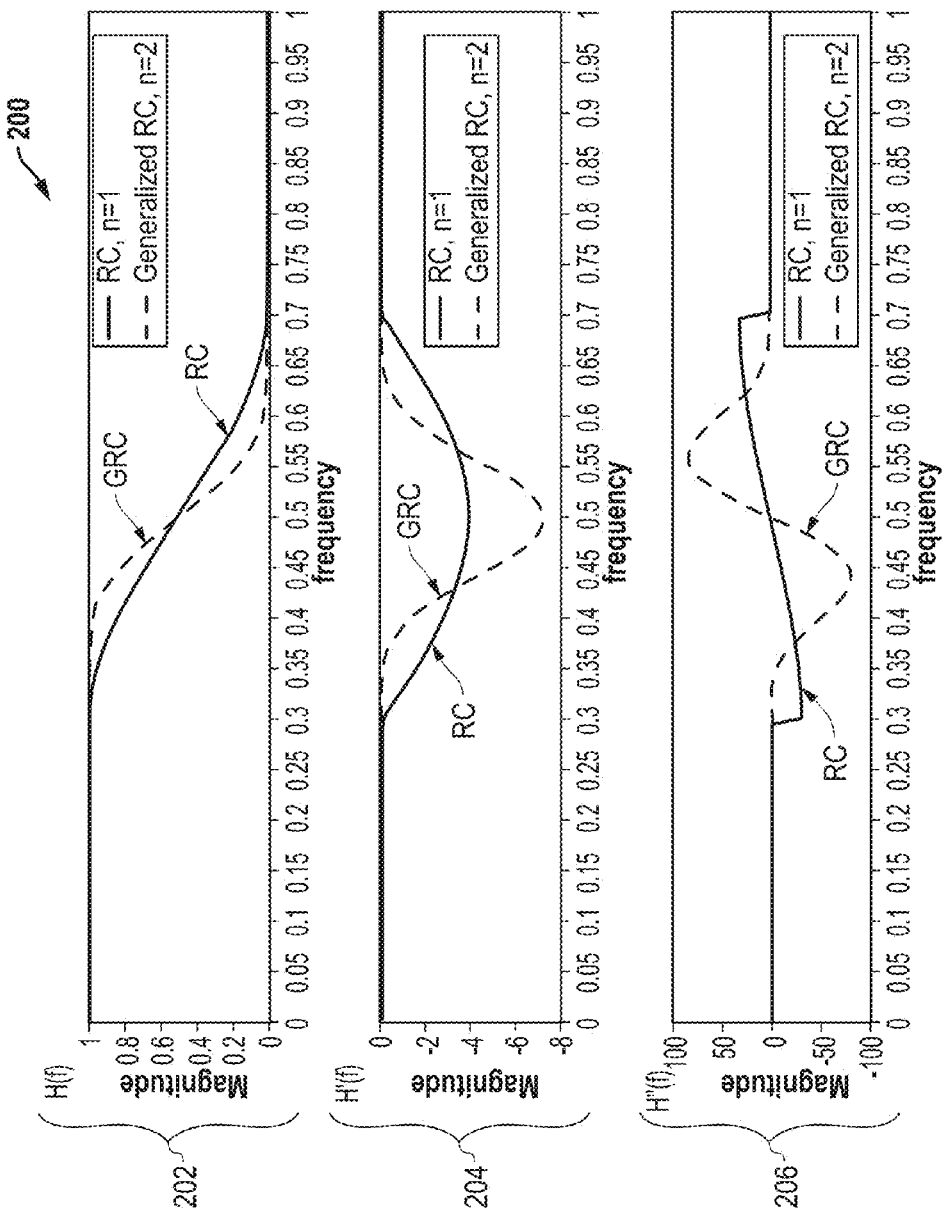
FIG. 2A provides frequency behavior of raised cosine (RC) filters (n=1) versus generalized RC filters (n=2 and up) for the first two derivatives.

FIG. 2A provides an example embodiment 200 showing frequency behavior of a raised cosine (RC) filter (n=1) versus a generalized raised cosine (GRC) filter (n=2) for the first two derivatives. The top signal diagram 202 provides the frequency response (H(f)) for the filter. The middle signal diagram 204 provides the first derivative, and the bottom signal diagram 206 provides the second derivative. As shown, FIG. 2A demonstrates that the generalized raised cosine (GRC) function in frequency space has a second continuous derivate while the original raised cosine (RC) function has a discontinuous second derivate.

The matrix M(n) above is a square Vandermonde matrix and both the determinant and the inverse have closed form solutions. This means that the solution vector $[A_1 \, A_3 \, \ldots \, A_{2n+1}]^T$ also has a closed-form solution.

Time Domain
Given $$H(f) = \begin{cases} T, |f| \leq \frac{1-\beta}{2T} \\ \frac{T}{2}\left\{1 + A_1\cos\left(\frac{\pi T}{\beta}\left[|f| - \frac{1-\beta}{2T}\right]\right)\right\} + \ldots + A_{2n+1}\cos\left((2n + 1)\frac{\pi T}{\beta}\left[|f| - \frac{1-\beta}{2T}\right]\right)\right\}, \frac{1-\beta}{2T} < |f| \leq \frac{1+\beta}{2T} \\ 0, \text{else} \end{cases} \quad (15)$$

The coefficients $[A_1 \, A_3 \, \ldots \, A_{2n+1}]^T$ are known and the time domain function h(t) is the inverse Fourier transform of H(f). The function H(f) is real, even-symmetric around f=0, and vanishes beyond $$\pm \frac{1+\beta}{2T}.$$

This means:

$$h(t) = \quad (16)$$

$$\int_{-\infty}^{\infty} H(f)e^{2\pi tf} df = 2T \int_0^{\frac{1-\beta}{2T}} \cos(2\pi tf) df + 2\int_{\frac{1-\beta}{2T}}^{\frac{1+\beta}{2T}} H(f)\cos(2\pi tf) df$$

The first integral on the right side simplifies to $$2T \int_0^{\frac{1-\beta}{2T}} \cos(2\pi tf) df = \frac{T}{\pi t} \sin\left(\frac{\pi t(1-\beta)}{T}\right) \quad (17)$$

To calculate the second integral we split H(f) into a constant term $$\frac{T}{2}$$

and into terms that contain expressions like $$\frac{T}{2} A_{2k+1}\cos\left((2n+1)\frac{\pi T}{\beta}\left[f - \frac{1-\beta}{2T}\right]\right)$$

where k=0, . . . , n.

To simplify the integrals and notation in general we work from now without losing essential features with the special case T=1.

The constant term generates the integral $$2\int_{\frac{1-\beta}{2}}^{\frac{1+\beta}{2}} \frac{1}{2}\cos(2\pi tf) df = \frac{\cos(\pi t)\sin(\pi \beta t)}{\pi t} \quad (18)$$

The remaining terms can be reduced to $$2\int_{\frac{1-\beta}{2}}^{\frac{1+\beta}{2}} \frac{1}{2} A_{2k+1}\cos\left((2k+1)\frac{\pi}{\beta}\left[f - \frac{1-\beta}{2}\right]\right)\cos(2\pi tf) df = \quad (19)$$

$$A_{2k+1} \frac{4\beta^2 t \sin(\pi t)\cos(\pi \beta t)}{(2k+1)^2 \pi - 4\pi\beta^2 t^2}$$

Combining (17) with T=1, (18), and (19) for n=0, i.e. k=0, and using $A_1=1$ generate after some simplifications the expected formula (2). Generalized raised-cosine filters can be constructed in a similar fashion. For T=1 we have:

$$h(t) = \frac{1}{\pi t}\sin(\pi t(1-\beta)) + \frac{\cos(\pi t)\sin(\pi \beta t)}{\pi t} + \sum_{k=0}^{k=n} A_{2k+1}\frac{4\beta^2 t \sin(\pi t)\cos(\pi \beta t)}{(2k+1)^2\pi - 4\pi\beta^2 t^2} \quad (20)$$

Formula (20) is valid as long as the denominators on the right side are not vanishing. For these finitely many values, continuation is applied. Formula (20) provides closed-form solutions for the functional behavior in time.

Root Raised-Cosine Vs. Generalized Root Raised-Cosine for Matched Filtering

Coming back to the cases n=1 vs. n=2 and using $$z = \frac{\pi T}{\beta}\left[|f| - \frac{1-\beta}{2T}\right] \quad (21)$$

we are dealing with the following frequency behavior (working with T=1):

$$\left[\cos\left(\frac{z}{2}\right)\right]*\left[\cos\left(\frac{z}{2}\right)\right] \text{ vs. } \left[\cos^2\left(\frac{z}{2}\right)\right]*\left[\left(3-2\cos^2\left(\frac{z}{2}\right)\right)\cos^2\left(\frac{z}{2}\right)\right] \quad (21)$$

The root raised-cosine filter is the inverse Fourier transform of $$\cos\left(\frac{z}{2}\right),$$

namely (again, T=1 for simplification), $$h(t) = \quad (22)$$

$$2\int_0^{\frac{1-\beta}{2}}\cos(2\pi tf)df + 2\int_{\frac{1-\beta}{2}}^{\frac{1+\beta}{2}}\cos\left(\frac{\pi}{2\beta}\left[f - \frac{1-\beta}{2}\right]\right)\cos(2\pi tf)df = $$

$$\frac{1}{\pi t}\sin(\pi t(1-\beta)) + \frac{4\beta[4\beta t\sin(\pi t(1-\beta)) + \cos(\pi t(\beta+1))]}{\pi - 16\pi\beta^2 t^2}$$

For n=2 the generalized root raised-cosine filters (there are at least two according to the above factorization) are (T=1):

$$h_1(t) = \quad (23)$$

$$2\int_0^{\frac{1-\beta}{2}}\cos(2\pi tf)df + 2\int_{\frac{1-\beta}{2}}^{\frac{1+\beta}{2}}\cos^2\left(\frac{\pi}{2\beta}\left[f - \frac{1-\beta}{2}\right]\right)\cos(2\pi tf)df = $$

$$\frac{1}{\pi t}\sin(\pi t(1-\beta)) + \frac{(1-8\beta^2 t^2)\sin(\pi t(1-\beta)) - \sin(\pi(1+\beta)t)}{2\pi t(4\beta^2 t^2 - 1)}$$

$$h_2(t) = 2\int_0^{\frac{1-\beta}{2}}\cos(2\pi tf)df + 2\int_{\frac{1-\beta}{2}}^{\frac{1+\beta}{2}}\left(3 - 2\cos^2\left(\frac{\pi}{2\beta}\left[f - \frac{1-\beta}{2}\right]\right)\right) \quad (24)$$

$$\cos^2\left(\frac{\pi}{2\beta}\left[f - \frac{1-\beta}{2}\right]\right)\cos(2\pi tf)df = \frac{1}{\pi t}\sin(\pi t(1-\beta)) + $$

$$\frac{3(1-2\beta^2 t^2)\sin(\pi(1+\beta)t) - (16\beta^4 t^4 + 22\beta^2 t^2 + 3)\sin(\pi(1-\beta)t)}{(4\pi t(4\beta^4 t^4 - 5\beta^2 t^2 + 1)}$$

$$h_1(t) = \quad (25)$$

$$2\int_0^{\frac{1-\beta}{2}}\cos(2\pi tf)df + 2\int_{\frac{1-\beta}{2}}^{\frac{1+\beta}{2}}\cos^3\left(\frac{\pi}{2\beta}\left[f - \frac{1-\beta}{2}\right]\right)\cos(2\pi tf)df = $$

$$\frac{1}{\pi t}\sin(\pi t(1-\beta)) + $$

$$\frac{32\beta^2 t^2(7-16\beta^2 t^2)\sin(\pi t(1-\beta)) + 3\cos(\pi(1+\beta)t)}{\pi(9-16\beta^2 t^2)(1-16\beta^2 t^2)}$$

$$h_2(t) = 2\int_0^{\frac{1-\beta}{2}}\cos(2\pi tf)df + 2\int_{\frac{1-\beta}{2}}^{\frac{1+\beta}{2}}\left(3 - 2\cos^2\left(\frac{\pi}{2\beta}\left[f - \frac{1-\beta}{2}\right]\right)\right) \quad (26)$$

$$\cos\left(\frac{\pi}{2\beta}\left[f - \frac{1-\beta}{2}\right]\right)\cos(2\pi tf)df = \frac{1}{\pi t}\sin(\pi t(1-\beta)) + $$

$$\frac{32\beta^2 t(13-16\beta^2 t^2)\sin(\pi(1-\beta)t) + 3(5-16\beta^2 t^2)\cos(\pi(1+\beta)t)}{\pi(9-16\beta^2 t^2)(1-16\beta^2 t^2)}$$

Performance Metrics

The performance of the filters will be evaluated against the following criteria. The computational complexity must then be limited at both the transmitter and receiver, another way of saying, the number of taps must be limited. Out of band emissions in the factored form must be measured at the transmitter and out of band rejection must be measured at the receiver. These are not necessarily the same numbers in the generalized case. Following that, the error in the zero crossings of the composite transmit/receive filter must be measured.

The filter is truncated:

$$h(t), t \in (-\infty, \infty) \gg h_D(t) \in \left(-\frac{D}{2}, \frac{D}{2}\right) \quad (27)$$

where D is related to the filter delay.

The first objective function is the OOB (out of band) emissions/rejection. It can be measured as follows:

$$E = 10\log_{10}\left(\frac{\int_{\frac{1+\beta}{2T}}^{\infty} H_D^2(\omega)d\omega}{\int_0^{\frac{1+\beta}{2T}} H_D^2(\omega)d\omega}\right) \quad (28)$$

If we call $h_t(t)$ the truncated transmit filter and $h_r(t)$ the truncated receive filter, the composite transmit/receive response, $h_c(t)$, the composite filter response, can be expressed as the convolution of the transmit and receive filters.

$$h_c(t) = \int_{-\frac{D}{2}}^{\frac{D}{2}} h_r(t') h_t(t-t') dt' \quad (29)$$

The second objective function is the inter-symbol interference (ISI) introduced by the composite filter. It can be expressed as follows:

$$ISI = \frac{\sum_{n \neq 0} h_c^2(nT)}{h_c^2(0)} \quad (30)$$

Where T is the symbol period. The results for a given filter are presented as a curve of ISI vs. OOB for a given D with a suite of curves for various D's.

Figure 2B:
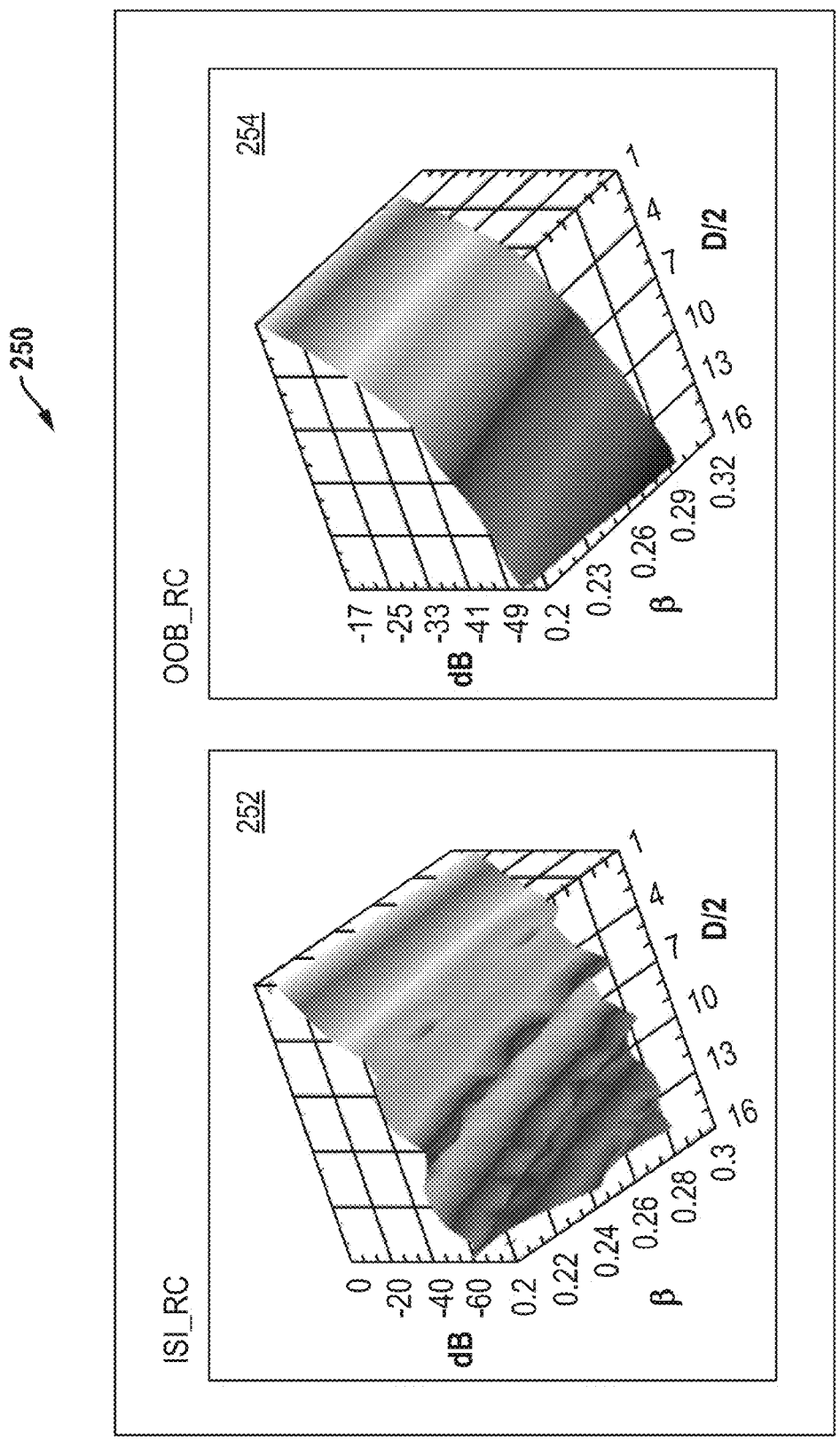
FIG. 2B displays the ISI (inter-symbol interference) and OOB (out of band) behavior for the original RC filter.

FIG. 2B shows an embodiment 250 including the ISI and OOB behavior 252/254 for the original raised cosine (RC) filter. D/2 varies from 1 to 16 and beta ($\beta$) covers the typical range of 0.2 to 0.3. All ISI and OOB values are displayed in dB.

Figure 3A:
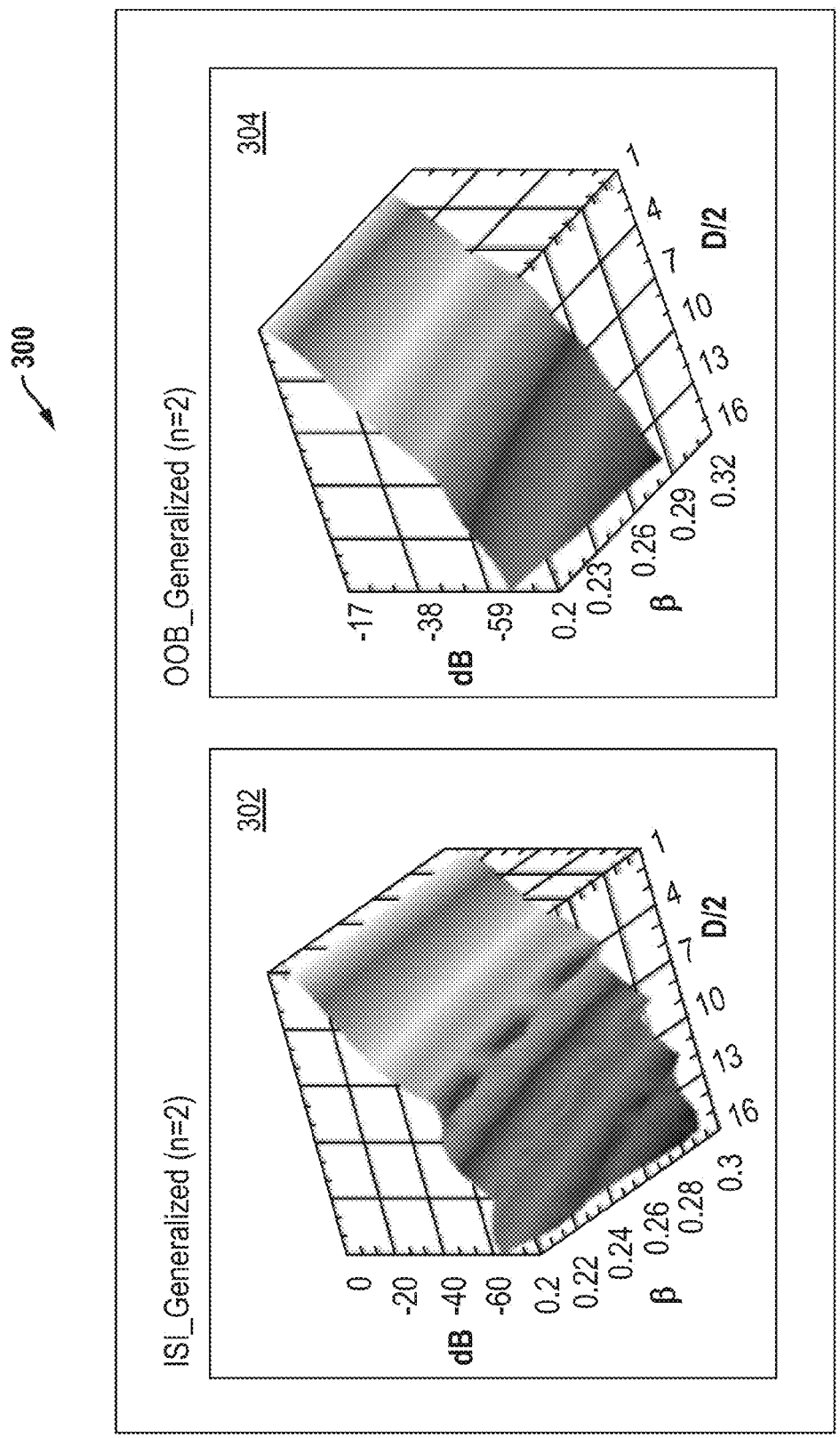
FIGS. 3A-B show the same data for the generalized RC filter for n=2 in FIG. 3A, and the two plots in FIG. 3B compare ISI and OOB values for the cases n=1 and n=2.

FIG. 3A shows an embodiment 300 including the same example data for the ISI and OOB behavior diagrams 302/304 for the generalized raised cosine (GRC) for n=2.

Figure 3B:
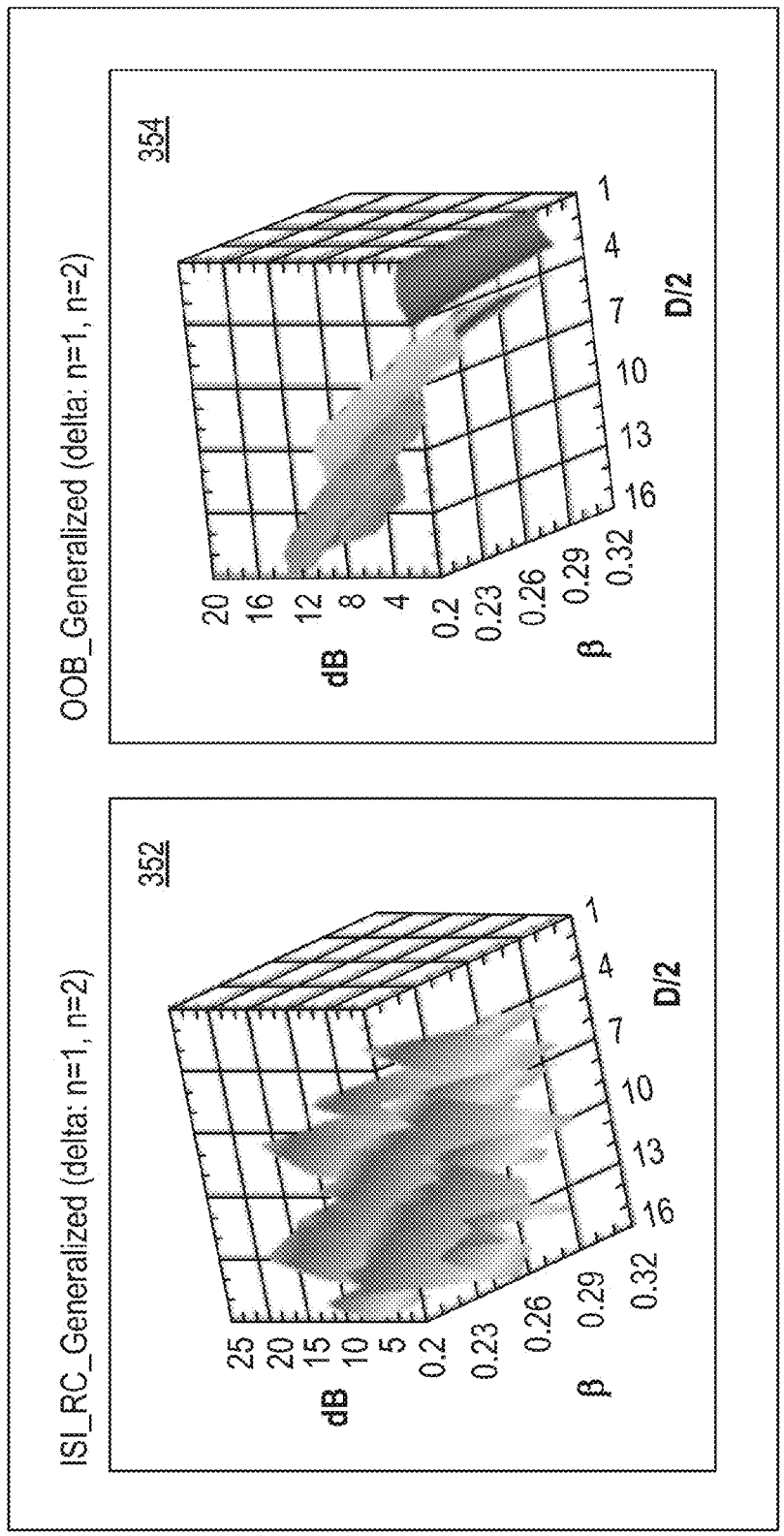

FIG. 3B shows an embodiment 350 including two plots 352/354 that compare ISI and OOB values for the cases n=1 and n=2. The ISI landscape is smoother for n=2 and the ISI gains are significant for most situations as long as D/2>7. The left plot 352 in FIG. 3B only displays the combinations of D/2 and beta ($\beta$) where the ISI is lower for n=2. The OOB values (right plot 354 in FIG. 3B) show a very consistent improvement for all D/2>7, for example, for D/2>12 the improvement is beyond 12 dB. These plots 352/354 only display points that improve on ISI or OOB.

Figure 4A:
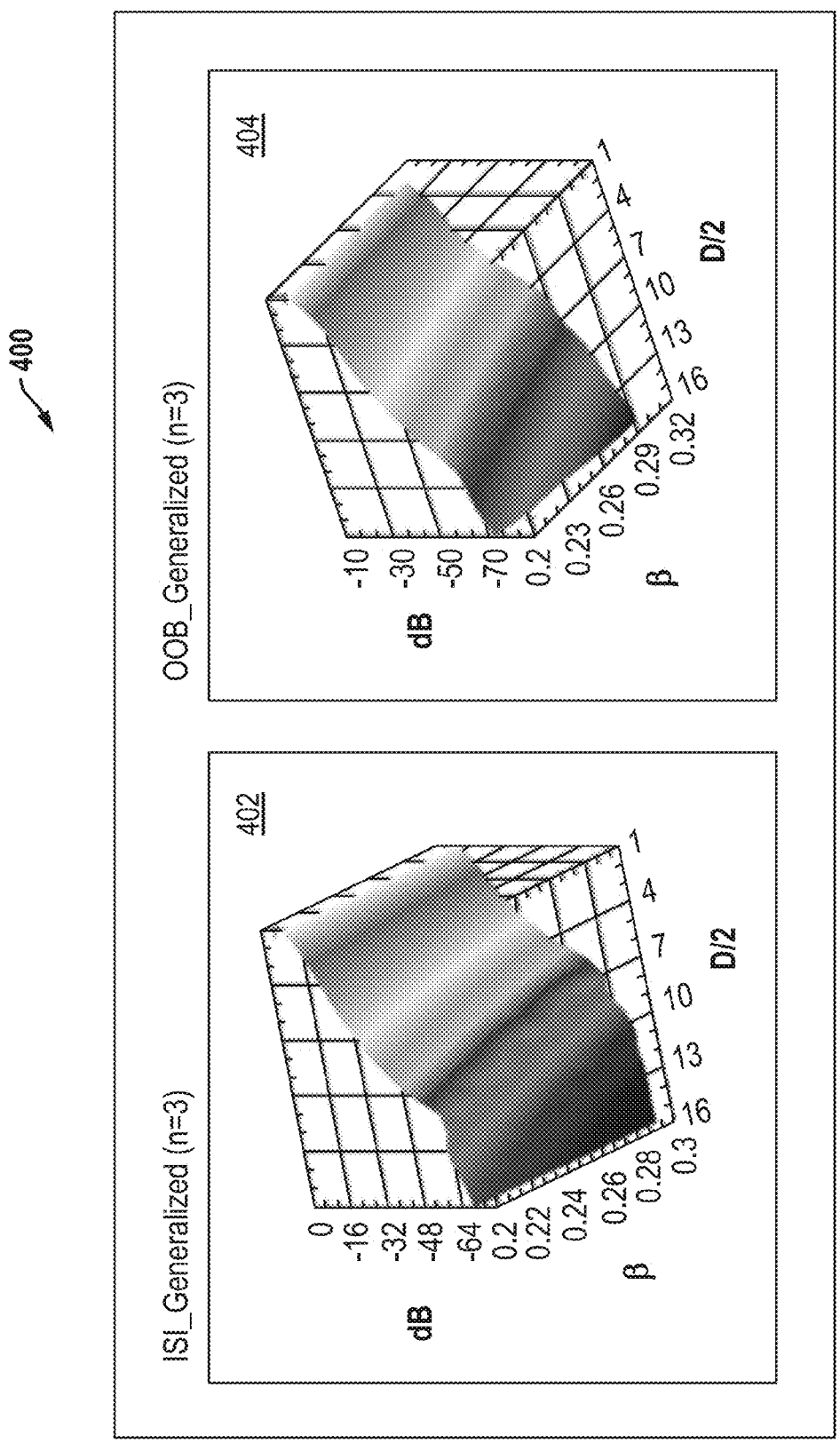
FIGS. 4A-B compare ISI and OOB values for the cases n=1 and n=3.

FIG. 4A shows an embodiment 400 including two plots 402/404 that provide ISI and OOB values for the case where n=3. The ISI landscape for n=3 is even smoother than the plot for n=2 and the ISI gains are significant for most situations as long as D/2>7.

Figure 4B:
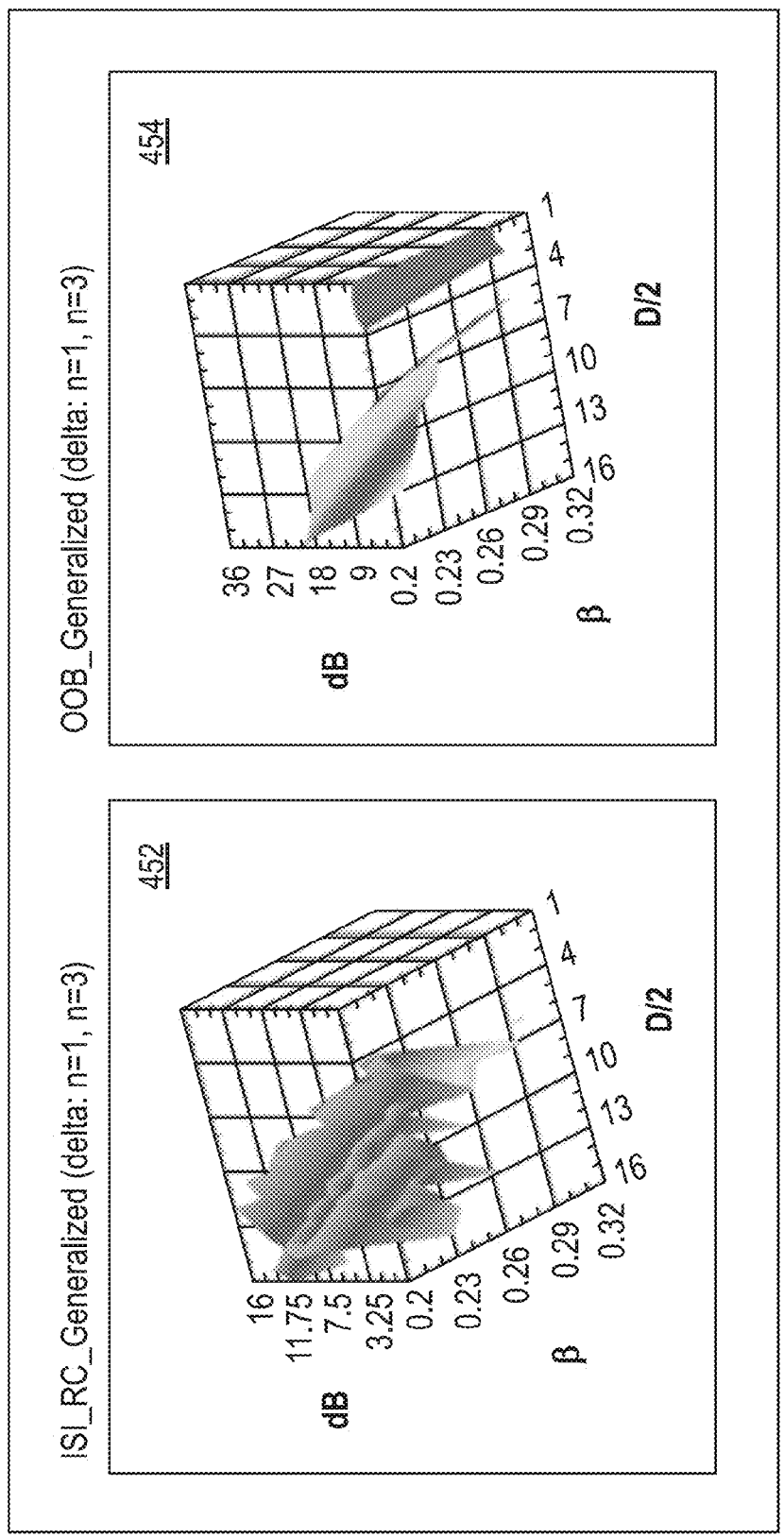

FIG. 4B shows an embodiment 450 including additional plots 452/454. The left plot 452 in FIG. 4B only displays the combinations of D/2 and beta ($\beta$) where the ISI is lower for n=3 compared to n=1. The OOB values (right plot 454 in FIG. 4B) shows a very consistent improvement for all D/2>7 reaching almost 30 dB for D/2 close to 16.

The raised cosine functions for n=1, 2, 3 can be regarded as the first members of an infinite family of generalized raised cosine functions and it is a natural idea to check linear combinations of sub-filters and related functions for their ISI and OOB parameter. To guarantee the desired H(f) behavior only linear combinations with non-negative coefficients sum up to unity are considered.

$$H(f) = \alpha_1 H_1(f) + \alpha_2 H_2(f) + \ldots + \alpha_m H_m(f), \alpha_k \geq 0,$$
$$\alpha_1 + \alpha_2 + \ldots + \alpha_m = 1 \quad (31)$$

Based on such a model for an individual choice of D/2 and beta ($\beta$) an optimal (e.g., minimized ISI) set of parameters $\alpha_1, \alpha_2, \ldots, \alpha_m$ can be determined. Those sets of $\alpha_1, \alpha_2, \ldots, \alpha_m$ will vary with D/2 and beta ($\beta$).

Figure 5:
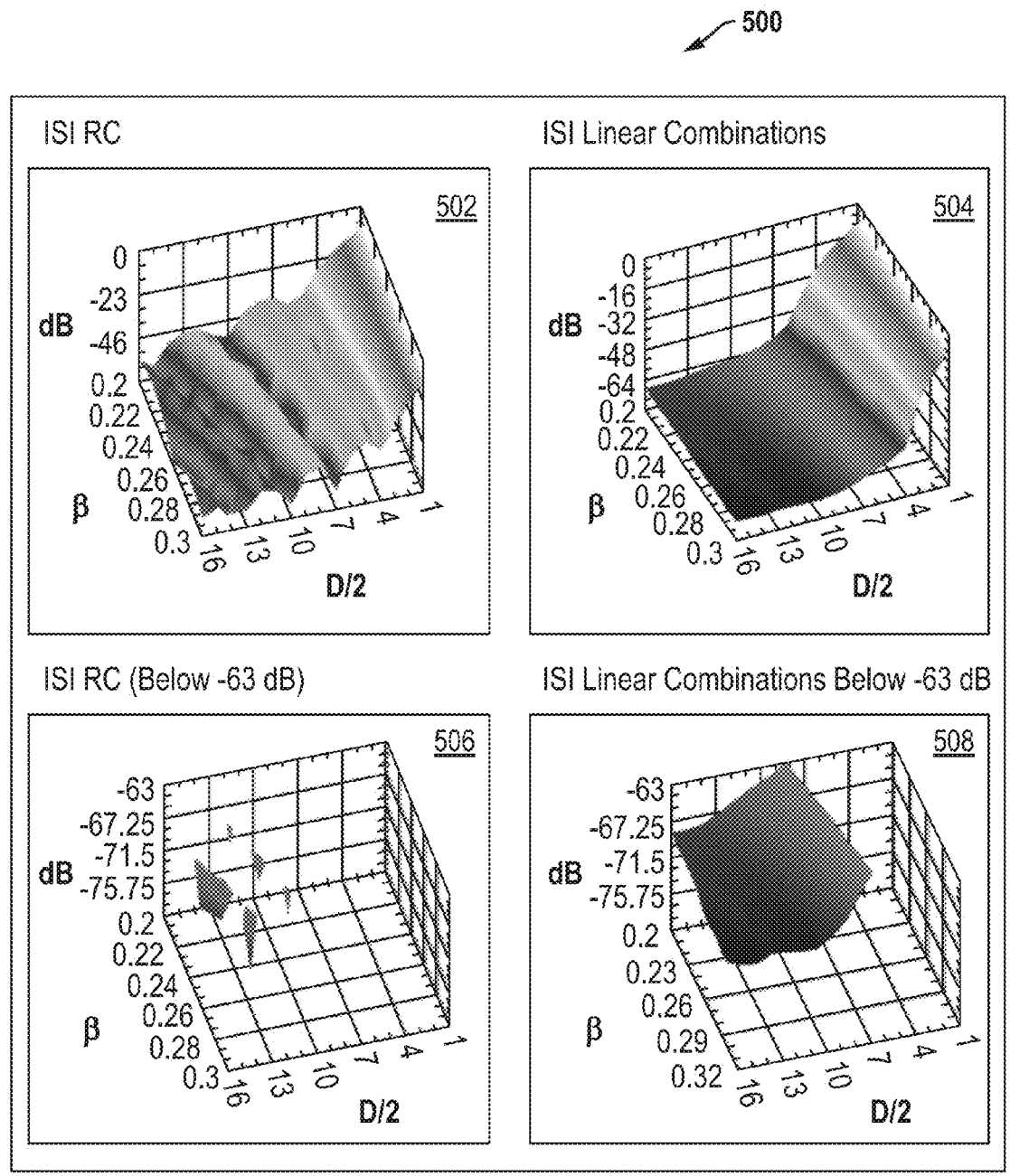
FIG. 5 provides ISI behavior comparisons for n=1 case and a constructed ideal function case.

FIG. 5 shows an embodiment 500 including four plots 502/504/506/608. A comparison of plot 502 for a raised cosine (RC) function with the linear combination of plot 504 demonstrates that optimal sets of $\alpha_1, \alpha_2, \ldots, \alpha_m$ for the case m=3 further reduce the ISI values of FIGS. 3A-B and 4A-B. The lower plots 506/508 of FIG. 5 display values below −63 dB for the raised cosine (RC) function (plot 506 in FIG. 5) and the linear combination (plot 508 in FIG. 5). While not displayed, it is noted that the already improved OOB values are not compromised by the linear combination. FIG. 5 provides ISI behavior for n=1 in the left two plots 502/506 for embodiment 500 and for the ideal function constructed according to formula (31) in the right two plots 504/508 for embodiment 500.

For linear combinations of smaller numbers of generalized raised cosine functions and related sub-filters, an exhaustive search can be applied to identify viable parameters. For example, for linear combinations of three components, listing can be made of all discrete $\alpha_1, \alpha_2, \alpha_3$ such that each parameter is chosen as $$\alpha_k = \frac{i}{N}, i = 0, \ldots, N.$$

Only combinations that satisfy $\alpha_1 + \alpha_2 + \alpha_3 = 1$ are valid. For larger numbers of components, optimization routines can be deployed to determine the $\alpha_k$ values for viable solutions.

It is appreciated that other families of Nyquist functions with higher orders of continuous derivatives may exist and it is anticipated that their summation will also further optimize the ISI/OOB performance in comparison to given filter order. As such, the linear combinations described herein for generalized raised cosine (GRC) filters can also be applied to other Nyquist filter solutions to provide improved system performance.

The question arises whether a combination of $\alpha_1, \alpha_2, \ldots, \alpha_m$ can be found that performs well for all D/2 for a given beta ($\beta$). As FIG. 6 demonstrates, such combinations do exist.

Figure 6:
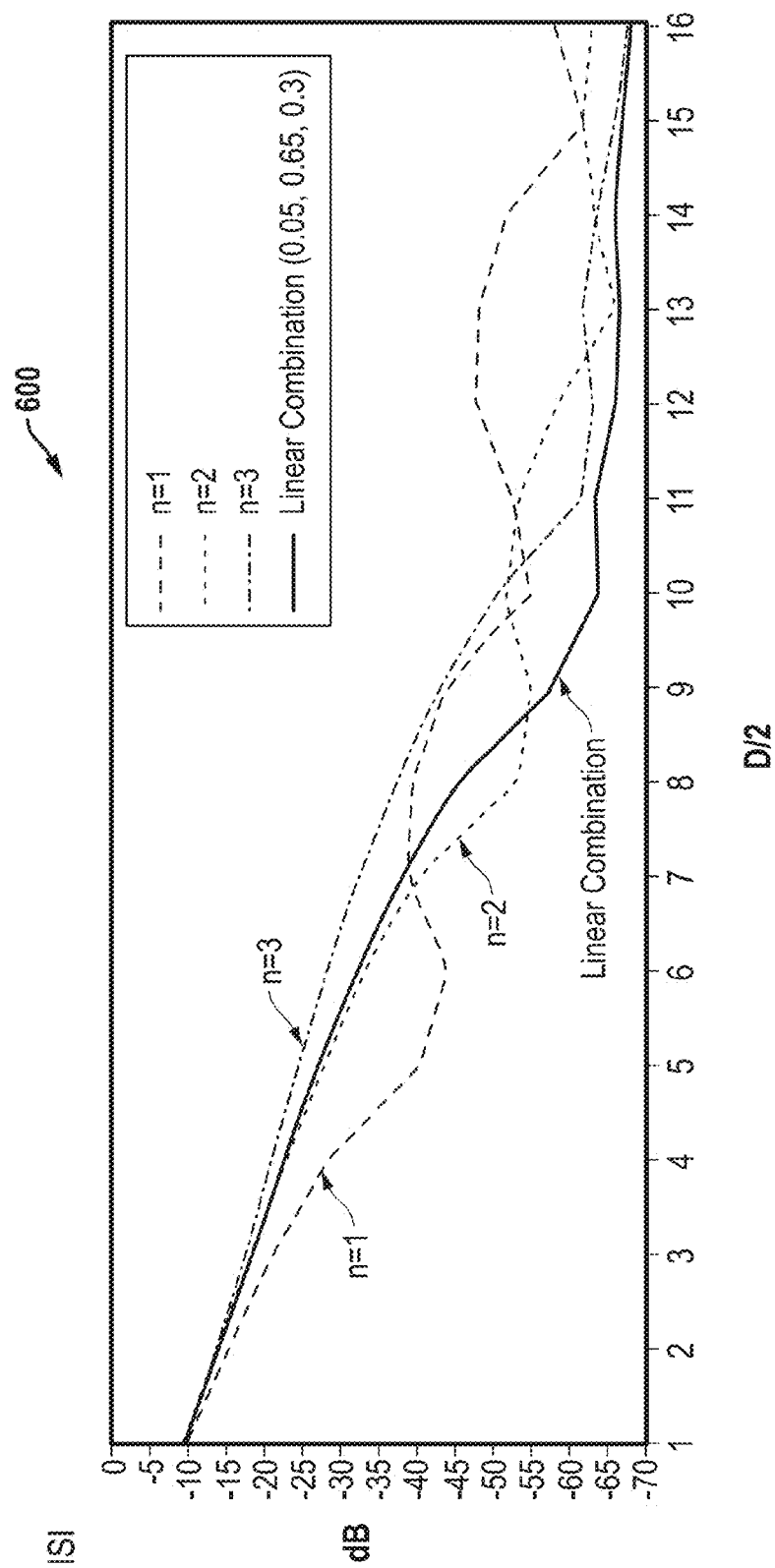
FIG. 6 provides behavior comparisons for raised cosine (n=1), generalizations (n=2, n=3), and special linear combination (0.05, 0.65, 0.3) embodiments.

FIG. 6 provides an embodiment 600 showing the behavior of raised cosine (n=1), generalizations (n=2, n=3), and special linear combination (0.05, 0.65, 0.3) of sub-filters with respect to changes in D/2 for beta=0.25.

Imbalanced Splitting

All factorizations of (13) and (14) allow closed-form inverse transformations. This is close to the spirit of the original raised cosine function. Here both factors are the same and have symbolic inverse Fourier transforms. Factorizations in (13) and (14) are imbalanced and the question arises whether this has consequences for the quality of OOB. Based on numerical experiments it can be stated that not all factorizations perform equally well. The best choice among (13) is:

$$\frac{1}{2}(1 + 9/8 \cos(1z) - 1/8 \cos(3z)) = \quad (32)$$

$$[\cos^2(\tfrac{z}{2})] * [(3 - 2\cos^2(\tfrac{z}{2})) \cos^2(\tfrac{z}{2})]$$

The OOB of the second factor is slightly worse than the OOB of the first factor but both are better than the original OOB based on the original raised cosine.

It is noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An apparatus to receive wireless communications, comprising:
    an antenna;
    receive circuitry coupled to receive input signals from the antenna, the input signals having a pulse shaping modulation; and
    a matched filter within the receive circuitry coupled to receive the input signals and to remove the pulse shaping modulation;
    wherein the matched filter is a generalized Nyquist filter that has a frequency response (H(f)) represented by frequency response equations:

$$H(f) = T; \text{ for } |f| \le (1-\beta)/2T$$

$$H(f) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T,$$

where f represents frequency, $A_n$ represent coefficients, T represents a symbol period, n represents an integer, and $\beta$ represents a roll-off factor.

2. The apparatus of claim 1, further comprising a decoder within the receive circuitry coupled to receive filtered signals from the matched filter and to output decoded signals.

3. The apparatus of claim 2, further comprising MAC (media access control) circuitry coupled to receive the decoded signals from the decoder and to output processed signals through an external interface.

4. The apparatus of claim 1, wherein the coefficients ($A_n$) satisfy a matrix (M(n)) for any given integer (n) represented by:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

5. The apparatus of claim 4, wherein n=2, $A_1$=9/8, and $A_3$=−1/8; or wherein n=3, $A_1$=75/64, $A_3$=−25/128, and $A_5$=3/128.

6. The apparatus of claim 4, wherein the matched filter comprises a plurality of sub-filters combined to form a linear combination of Nyquist filters each having a frequency response (H(f)) represented by the frequency response equations in claim 1 and satisfying the matrix (M(n)) for any given integer (n).

7. An apparatus to transmit wireless communications, comprising:
    an antenna;
    transmit circuitry coupled to provide transmit signals to the antenna, the transmit signals having a pulse shaping modulation; and
    a pulse shape filter within the transmit circuitry coupled to receive output signals and to apply the pulse shaping modulation to the output signals for the transmit circuitry;
    wherein the pulse shape filter is a generalized Nyquist filter that has a frequency response (H(f)) represented by frequency response equations:

$$H(f) = T; \text{ for } |f| \le (1-\beta)/2T$$

$$H(f) = \frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \ldots + A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T$$

where f represents frequency, $A_n$ represent coefficients, T represents a symbol period, n represents an integer, and $\beta$ represents a roll-off factor.

8. The apparatus of claim 7, further comprising a modulator within the transmit circuitry coupled to provide modulated output signals to the pulse shape filter.

9. The apparatus of claim 8, further comprising MAC (media access control) circuitry coupled to process signals received through an external interface and to provide processed signals to the modulator.

10. The apparatus of claim 7, wherein the coefficients ($A_n$) satisfy a matrix (M(n)) for any given integer (n) represented by:

$$M(n)\begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

11. The apparatus of claim 10, wherein n=2, $A_1$=9/8, and $A_3$=−1/8; or wherein n=3, $A_1$=75/64, $A_3$=−25/128, and $A_5$=3/128.

12. The apparatus of claim 10, wherein the pulse shape filter comprises a plurality of sub-filters combined to form a linear combination of Nyquist filters each having a frequency response (H(f)) represented by the frequency response equations in claim 7 and satisfying the matrix (M(n)) any given integer (n).

13. A method to receive wireless communications, comprising:
receiving input signals through an antenna, the input signals having a pulse shaping modulation;
filtering the input signals circuitry with a matched filter to remove the pulse shaping modulation; and
outputting the filtered signals for further processing by receive circuitry;
wherein the matched filter is a generalized Nyquist filter that has a frequency response (H(f)) represented by the frequency response equations:

$$H(f) = T; \text{ for } |f| \le (1-\beta)/2T$$

$$H(f) =$$
$$\frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \cdots + \right.$$
$$\left. A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T$$

where f represents frequency, $A_n$ represent coefficients, T represents a symbol period, n represents an integer, and $\beta$ represents a roll-off factor.

14. The method of claim 13, further comprising decoding the filtered signals to output decoded signals for the receive circuitry.

15. The method of claim 14, further comprising processing the decoded signals with MAC (media access control) circuitry and outputting processed signals through an external interface.

16. The method of claim 13, wherein the coefficients ($A_n$) satisfy a matrix (M(n)) for any given integer (n) represented by:

$$M(n)\begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

17. The method of claim 16, wherein n=2, $A_1$=9/8, and $A_3$=−1/8; or wherein n=3, $A_1$=75/64, $A_3$=−25/128, and $A_5$=3/128.

18. The method of claim 16, wherein the filtering comprises filtering the input signals with a matched filter including a plurality of sub-filters combined to form a linear combination of Nyquist filters each having a frequency response (H(f)) represented by the frequency response equations in claim 13 and satisfying the matrix (M(n)) any given integer (n).

19. A method to transmit wireless communications, comprising:
receiving output signals to be transmitted;
filtering the output signals with a pulse shape filter to apply a pulse shaping modulation and to generate transmit signals having the pulse shaping modulation; and
transmitting the transmit signals through an antenna;
wherein the pulse shape filter is a generalized Nyquist filter that has a frequency response (H(f)) represented by frequency response equations:

$$H(f) = T; \text{ for } |f| \le (1-\beta)/2T$$

$$H(f) =$$
$$\frac{T}{2}\left\{A_0 + A_1\cos\left(1\frac{\pi T}{\beta}\left[|f| - \frac{1-\beta}{2T}\right]\right) + A_3\cos\left(3\frac{\pi T}{\beta}\left[|f| - \frac{1-\beta}{2T}\right]\right) + \cdots + \right.$$
$$\left. A_{2n+1}\cos\left((2n+1)\frac{\pi T}{\beta}\left[|f| - \frac{1-\beta}{2T}\right]\right)\right\}; \text{ for } \frac{1-\beta}{2T} < |f| \le \frac{1+\beta}{2T}$$

$$H(f) = 0; \text{ for } |f| > (1+\beta)/2T$$

where f represents frequency, $A_n$ represent coefficients, T represents a symbol period, n represents an integer, and $\beta$ represents a roll-off factor.

20. The method of claim 19, further comprising modulating the output signals prior to the filtering.

21. The method of claim 20, further comprising receiving external signals from an external interface with MAC (media access control) circuitry and providing processed signals for the modulating.

22. The method of claim 19, wherein the coefficients ($A_n$) satisfy a matrix (M(n)) for any given integer (n) represented by:

$$M(n)\begin{bmatrix} A_1 \\ A_3 \\ \vdots \\ A_{2n+1} \end{bmatrix} = \begin{bmatrix} 1 & 1 & \cdots & 1 \\ 1^2 & 3^2 & \cdots & (2n+1)^2 \\ \vdots & \vdots & \vdots & \vdots \\ 1^{2n} & 3^{2n} & \cdots & (2n+1)^{2n} \end{bmatrix} \begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

23. The method of claim 22, wherein n=2, $A_1$=9/8, and $A_3$=−1/8; or wherein n=3, $A_1$=75/64, $A_3$=−25/128, and $A_5$=3/128.

24. The method of claim 22, wherein the filtering comprises filtering the output signals with a pulse shape filter including a plurality of sub-filters combined to form a linear combination of Nyquist filters each having a frequency response (H(f)) represented by the frequency response equations in claim 19 and satisfying the matrix (M(n)) any given integer (n).

* * * * *